United States Patent [19]
Robison

[11] Patent Number: 6,056,062
[45] Date of Patent: May 2, 2000

[54] SURGICAL BLOCK FOR ELEVATING THE HEALTHY CLAW OF CLEFT-FOOTED ANIMAL

[76] Inventor: Travis L. Robison, 1270 E. college, Mt. Angel, Oreg. 97362

[21] Appl. No.: 09/168,352

[22] Filed: Oct. 7, 1998

[51] Int. Cl.⁷ ............................... A01L 5/00; A01L 9/00; A01L 3/02
[52] U.S. Cl. .................. 168/24; 168/28; 168/DIG. 1; 119/850
[58] Field of Search .................. 168/4, 24, 28, 168/DIG. 1; 119/850

[56] References Cited

U.S. PATENT DOCUMENTS

| | | | |
|---|---|---|---|
| 3,302,723 | 2/1967 | Renkenberger et al. | 168/24 X |
| 5,272,857 | 12/1993 | Logan | 54/82 |
| 5,518,342 | 5/1996 | Wright et al. | 405/211 |
| 5,533,575 | 7/1996 | Brown | 168/28 X |

FOREIGN PATENT DOCUMENTS 2641942  7/1990  France ...................... 168/28

Primary Examiner—Robert P. Swiatek
Attorney, Agent, or Firm—Klarquist Sparkman Campbell Leigh & Whinston, LLP

[57] ABSTRACT

A surgical block for attachment to a healthy claw of a cleft-footed animal is made of a blend of polyvinyl chloride and calcium carbonate. The block has parallel faces which are mirror images of each other. The faces are joined by a planar sidewall extending the full length of the block, and a second side wall having a planar section parallel to the first side wall and a forwardly disposed curved section forming the forward end of the block. A planar end wall is perpendicular to the planar portions of the two side walls. Each of the faces has a plurality of longitudinally extending zigzag grooves to receive an acrylic adhesive to attach the block to the animal's claw.

6 Claims, 1 Drawing Sheet

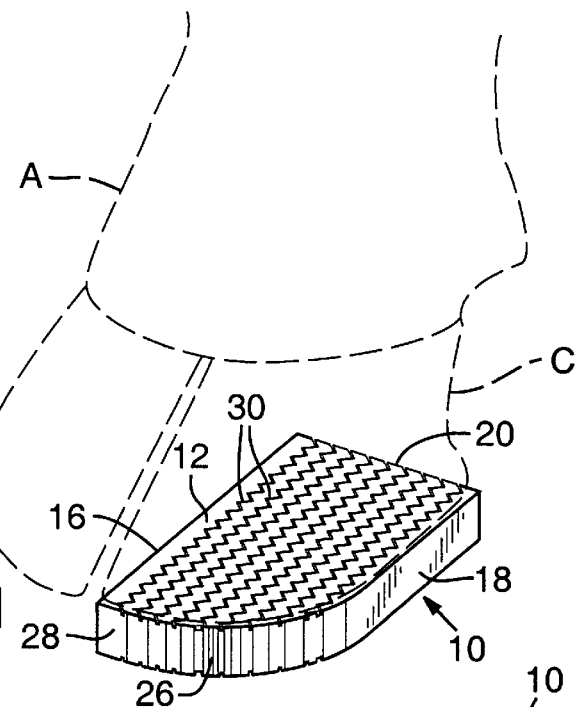
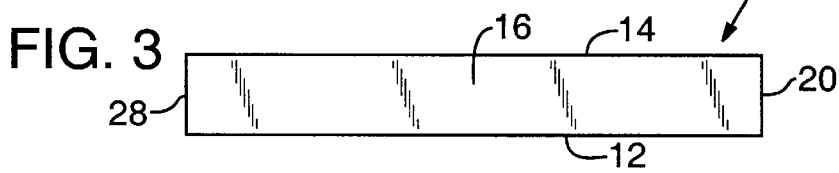
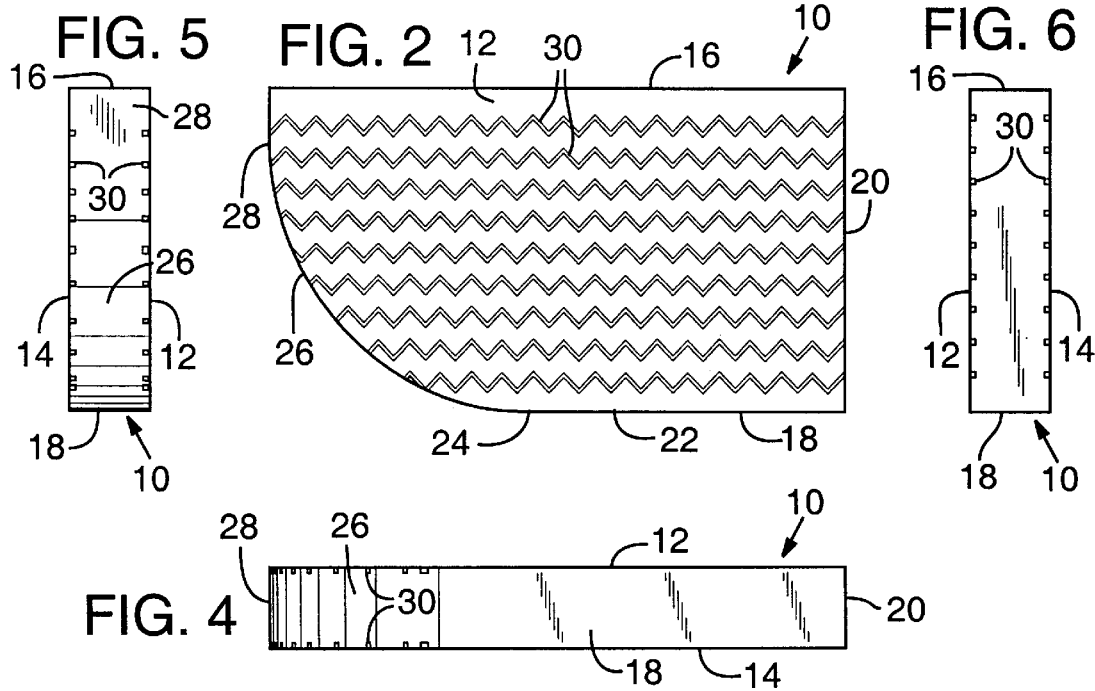

SURGICAL BLOCK FOR ELEVATING THE HEALTHY CLAW OF CLEFT-FOOTED ANIMAL

FIELD OF THE INVENTION

This invention relates to a surgical block which is intended to be adhesively attached to one of the claws of the foot of a cleft-footed animal, and more particularly, to such a block for use in veterinary practice as, for example, in the treatment of the disease known as "lame cow."

BACKGROUND OF THE INVENTION

Lameness in dairy animals results in pain and distress and this translates quickly into appreciable reductions in milk yield. In the past herdsmen treated the disease by first fashioning a block of wood to fit the healthy claw of a foot so afflicted. The block was then attached to the underside of the claw, thereby slightly to elevate the diseased claw and permit it to heal. Of course, this practice left the animal's foot with only about one-half of its normal area of contact with the ground. This in turn made the leg prone to slipping, which was also stressful for the animal.

A surgical slipper designed to remedy the foregoing deficiencies was disclosed in Logan, U.S. Pat. No. 5,272,857. This slipper was disclosed as being designed for attachment to the diseased claw. Inasmuch as the animal's foot was received within the slipper, both left and right configurations were required. A feature of the design was the provision of a lattice in the form of an array of intersecting ribs which projected from the underside of the slipper sole. The ribs were deep enough to elevate the claw to which the slipper was attached. The sole was made thin enough so that a hole could readily be punched through it between two adjacent ribs. The hole permitted pus to drain from the diseased claw.

In practice it was soon discovered that attaching the slipper to a diseased claw was highly inappropriate, thus the provision of a hole in the bottom did not serve any useful purpose. It was also discovered that any device had to be attached to the healthy claw such that the diseased claw could be left open to the air to facilitate healing. Also, inasmuch as the Logan device was in the form of a slipper, herdsmen had to stock both left and right configurations.

It is thus the principal object of the present invention to provide a surgical block to elevate the healthy claw of a cleft-footed animal that will permit the diseased claw to heal properly and which will be an improvement over devices heretofore known.

It is a further object of the present invention to provide such a device that can be used for either left or right claws such that the herdsman need only stock one model.

It is a still further object of the present invention to provide such a device that will obviate the tendency of the animal's leg to slip.

SUMMARY OF THE INVENTION

My surgical block comprises a unitary elastomeric block which has a shape in plan generally compatible with the imprint in plan of a pared, trimmed and rasped healthy claw of a cleft-footed animal, such as a cow. The block has a pair of substantially parallel faces. The faces are joined by (1) a first substantially planar side wall, (2) a second side wall comprising a substantially planar section generally parallel to the first planar side wall, the forward end of the planar section being joined to a curved section disposed at the forward end of the block, the curved section joining the first planar side wall at the forward end of the first planar side wall, and (3) a substantially planar end wall disposed generally perpendicularly to the first planar side wall and the planar section of the second side wall.

Each of the parallel faces of the block is provided with a plurality of grooves adapted to receive an adhesive. Inasmuch as the two faces of the block are essentially mirror images of each other, one of the faces can be adhesively attached to one of the claws and the other of the faces can be attached to the other of the claws, depending on which claw needs to be elevated.

I have found that a block made of a blend of polyvinyl chloride and calcium carbonate is flexible enough to use in this application, yet provides adequate ground resistance so as to prevent the animal from slipping. I have found that making the block about eleven-sixteenth inch thick is preferable.

I have also found that the grooves preferably have a width and a depth of about one-sixteenth inch each. Although many groove designs can be used, one that I have found appropriate comprises a plurality of zigzag grooves disposed generally longitudinally of the block.

An adhesive suitable for use in attaching the block to a healthy claw comprises an acrylic adhesive.

BRIEF DESCRIPTION OF THE DRAWINGS

FIG. 1 is a perspective view of my surgical block shown attached to the healthy claw of a cleft-footed animal, the leg of the animal being shown in dashed lines.

FIG. 2 is a top plan view of one face of the block, the other face being substantially a mirror image thereof.

FIG. 3 is a view of one side of the block.

FIG. 4 is a view of the other side of the block.

FIG. 5 is a front end view of the block.

FIG. 6 is a rear end view of the block.

DESCRIPTION OF THE PREFERRED EMBODIMENT

Referring to the drawings, FIG. 1 illustrates a block 10 which can be seen to have a shape in plan generally the same as and thus compatible with the imprint in plan of the underside of a pared, trimmed and rasped healthy claw C of a cleft-footed animal A. The block 10 preferably comprises a blend of polyvinyl chloride and calcium carbonate and is obtainable from Modified Plastics, Inc., Santa Ana, Calif. 92707 as its product MPVC-C20. A block made of this material provides sufficient flexibility, yet also provides adequate ground resistance so that a cow, so fitted, will not tend to slip while walking.

The block 10 has an upper face 12 and a lower or opposite face 14. Faces 12 and 14 are essentially mirror images of each other, such that face 12 can be adhesively attached to the left claw of the animal and face 14 can be adhesively attached to the right claw. The faces 12, 14 are joined by a first substantially planar side wall 16, which extends the full length of the block 10 and will always face the inside of the animal's foot, a second side wall 18, and an end wall 20. The second side wall 18 comprises a substantially planar section 22, which is disposed generally parallel to the first side wall 16, the forward end 24 of section 22 being joined to a curved section 26, which comprises and forms the forward end 28 of the block 10. The end wall 20 is also substantially planar and is disposed generally perpendicularly to the first planar side wall 16 and the planar section 22 of the second side wall 18.

A block 10 suitable for this use is preferably made with a side wall 16 four and nine-sixteenths inches long, a planar section 22 three and one-sixteenth inches long, an end wall 20 two and one-half inches wide, and a curved section 26 four inches in circumference. The block 10 is preferably made eleven-sixteenths inch thick.

Each of the faces 12 and 14 is provided with a plurality of generally longitudinally extending grooves 30, preferably nine of them, transversely equally spaced across the block 10, each preferably having a width of one-sixteenth inch and a depth of one-sixteenth inch. The grooves 30 have a generally zigzag shape in the longitudinal direction, as shown, although many other patterns and shapes can be used.

The purpose of the grooves 30 is not to provide traction, such being adequately provided by the material of the block itself. Rather, the grooves serve to receive and accept an acrylic resin adhesive which is used to adhere the block 10 to the healthy claw. Acrylic adhesives suitable for this purpose may be obtained from Jorgensen Laboratories, Loveland, Colo., as "Technovit" powder and liquid; Kane Enterprises, Inc., Sioux Falls, S.Dak., as "Demotec 95" powder and liquid; Haffner International, as "Hoof It" powder and liquid; and American Giltspur, Sarasota, Fla., as "Cow Slips"

Inasmuch as changes may be made in the in the block without departing from the scope of the invention herein involved, it is intended that all matter contained in the above description and shown in the accompanying drawings shall be interpreted only as illustrative and not in a limiting sense.

I claim:

1. A surgical block for elevating the healthy claw of a cleft-footed animal, comprising:

a unitary elastomeric block having a shape in plan generally compatible with the imprint in plan of a pared, trimmed and rasped healthy claw of a cleft-footed animal, the block comprising a pair of substantially parallel faces, the faces being joined by (1) a first substantially planar side wall, (2) a second side wall comprising a substantially planar section generally parallel to the first planar side wall, the forward end of the planar section being joined to a curved section disposed at the forward end of the block, the curved section joining the first planar side wall at the forward end of the first planar side wall, and (3) a substantially planar end wall disposed generally perpendicularly to the first planar side wall and the planar section of the second side wall, the parallel faces of the block being each provided with a plurality of grooves, the grooves being adapted to receive an adhesive, whereby one of the faces of the block is compatible in shape and can be adhesively attached to one of the claws and the other of the faces of the block is compatible in shape and can be adhesively attached to the other of the claws.

2. The surgical block of claim 1, wherein the block comprises polyvinyl chloride and calcium carbonate.

3. The surgical block of claim 1, wherein the grooves have a width of about one-sixteenth inch and a depth of about one-sixteenth inch.

4. The surgical block of claim 1, wherein the grooves comprise zigzag grooves disposed generally longitudinally of the block.

5. The surgical block of claim 1, wherein the block has a thickness of about eleven-sixteenth inch.

6. The surgical block of claim 1, in combination with an acrylic adhesive adapted to fill the grooves and attach the block to a claw.

* * * * *